United States Patent [19]

Visalli et al.

[11] Patent Number: 4,825,812

[45] Date of Patent: May 2, 1989

[54] HORSE PACIFIER

[76] Inventors: William R. Visalli, 612 Windsor Dr., Lodi, Calif. 95240; Duane E. Saville, 9613 Duchess La., Stockton, Calif. 95209; Terry Quashnick, 815 Kramer Dr., Lodi, Calif. 95242

[21] Appl. No.: 28,667

[22] Filed: Mar. 20, 1987

[51] Int. Cl.[4] ............................................. A01K 13/00
[52] U.S. Cl. ...................................... 119/64; 119/29.5
[58] Field of Search .......................... 119/29, 29.5, 64; 446/227; 51/285

[56] References Cited

U.S. PATENT DOCUMENTS

| 275,370 | 4/1883 | Ellis | 119/64 |
| 662,745 | 11/1900 | Thompson et al. | 119/64 |
| 3,468,290 | 9/1969 | Elliott | 119/29 |
| 4,611,556 | 9/1986 | Frank | 119/29 |

FOREIGN PATENT DOCUMENTS 168316 12/1904 Fed. Rep. of Germany ........ 119/64

*Primary Examiner*—Robert P. Swiatek

[57] ABSTRACT

A device used to pacify horses contained in an enclosed area which, out of boredom, chew on anything within reach. The device preferably consists of a series of elastomer rubber pieces that may rotate on a shaft. Horses are enticed to bite or chew the rubber pieces in the device through scent and their natural curiosity. When a horse plays with the device by chewing or biting, the rubber pieces rotate. The rotation of the rubber pieces plus the associated noise created by movement of the shaft in a supporting slot entertains or amuses the horse, serving as a pacifier to relieve horse boredom and reduce the penchant of horses to chew other objects.

16 Claims, 2 Drawing Sheets

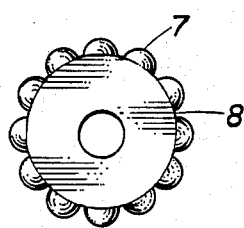
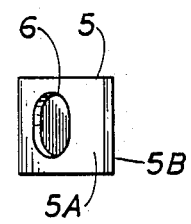
FIG. 4  FIG. 5
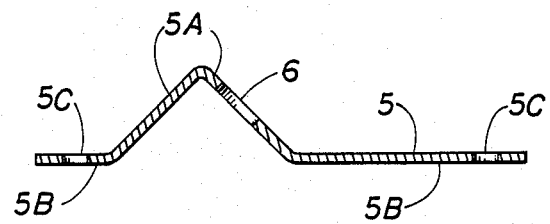
FIG. 6
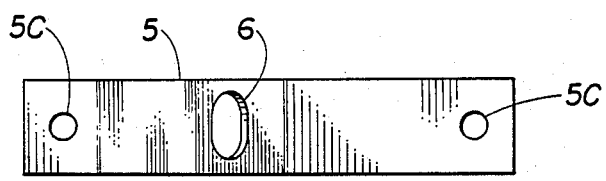
FIG. 7

HORSE PACIFIER

BACKGROUND OF THE INVENTION

Horses are confined for long periods of time in enclosed areas (stalls, paddocks, corrals, etc.). During confinement horses often become bored, especially if seldom ridden or exercised. To relieve boredom a horse will chew on almost anything in the enclosed area.

Previous known attempts by horse owners to relieve boredom and stop destructive chewing by horses include hanging objects from the ceiling (plastic balls, empty Clorex bottles, etc.) for the horse to bat or move with its head. Many times these objects are knocked loose and tramped on by the horse within a very short period of time. Some horse owners also paint toxic substances such as creosote on wood fences to stop chewing. As far as it is known none of these attempts have alleviated the problem of stopping destructive chewing.

SUMMARY OF THE INVENTION

To alleviate the shortcomings of the existing methods, the present invention is developed to provide a safe non-toxic device that a horse is attracted to chew on. The device consists of elastomer rubber pieces that may rotate independently on a shaft when bitten by a horse. The turning/rotating motion serves as a puzzle to the horse and challenges the horse's natural inquisitiveness, thereby amusing the horse, relieving boredom from being confined for long hours and reducing destructive chewing.

The elastomer rubber pieces also have a scent added to the rubber which is appealing to a horse. In addition, an oblong slot holding the round shaft in a wal bracket provides some noise capability from movement of the shaft up and down in the slot by the horse as a horse plays with the invention. This noise is entertaining to a bored horse. The combination of scent, movement, and noise are inviting to a horse so the horse will continue to play with the device rather than chew on other objects in the area.

OBJECTS OF THE INVENTIONS

The primary object of the invention is to provide a safe, nontoxic device for horses to chew on the relieve stall boredom and reduce destructive chewing of other objects. To achieve this purpose the invention consists of at least one elastomer rubber piece that rotates on a shaft when a horse bites or chews the rubber pieces.

Another object of the invention is to provide a device attractive to horses so that a horse will continue to use the device for an extended period of time. This is accomplished through adding appealing scents to the elastomer rubber pieces, using a sleeve(s) in the rubber piece(s), causing movement (spinning) of the elastomer rubber pieces on the shaft and by having the device make some noise as a horse plays with the device.

A third object is to break horses of the bad habit of chewing other objects in the area by offering the horse a more desirable alternative.

A fourth object is to locate the invention in an enclosed area for horses where the device will not be a protrusion that can injure a horse should the horse back into or brush against a wall. Through two angular brackets the device is installed in a corner of a horse pen so that the two adjoining walls form a natural barrier in the corner. Because the device is installed between two walls in a corner the device is protected in three directions- the two sides and the back. As a result a horse can't brush against the device. Additionally, should a horse back into the corner, the horse will hit both side walls before the horse touches the device.

Other objects and advantages of the invention will become more apparent from the specification taken in conjunction with the following drawings.

BRIEF DESCRIPTION OF THE DRAWING FIGURES

The individual components in the referred invention are as follows:

Note: A wheel as used in the following context means a piece of elastomer rubber of any external shape with a hole from which it can turn or rotate on a central axis (shaft). For the sake of simplicity the drawings reflect a round outer periphery on the elastomer components. The actual outer design of the elastomer rubber wheel can be any shape as long as the wheel is capable of being rotated on the shaft.

1. FIG. 1 is an isometric (top) view of the assembled components of the referred invention.
2. FIG. 2 is a front view of the assembled components of the referred invention.
3. FIG. 3 is a front cross sectional view of the assembled components of the referred invention as viewed along lines 3—3 of FIG. 1.
4. FIG. 4 is a side view of the ribbed rubbed wheel.
5. FIG. 5 is a back view of the corner wall bracket.
6. FIG. 6 is a cross sectional top view of the corner wall bracket.
7. FIG. 7 is a side view of the corner wall bracket.

DETAILED DESCRIPTION OF THE PREFERRED EMBODIMENT

Figure 1:
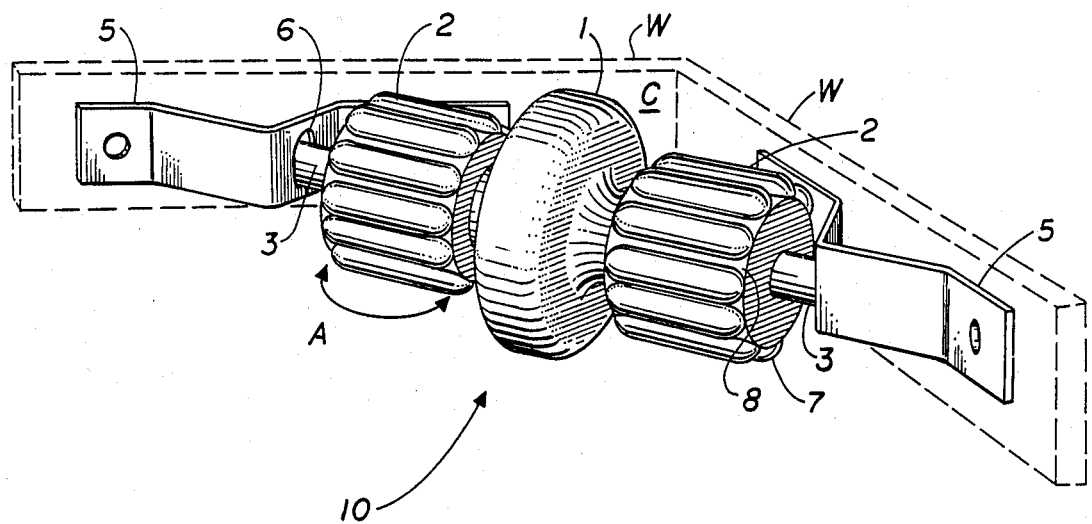
Figure 2:
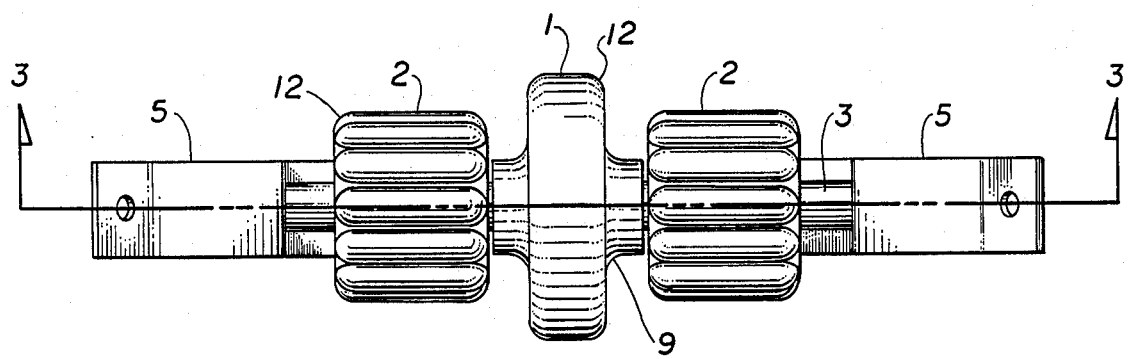
Figure 3:
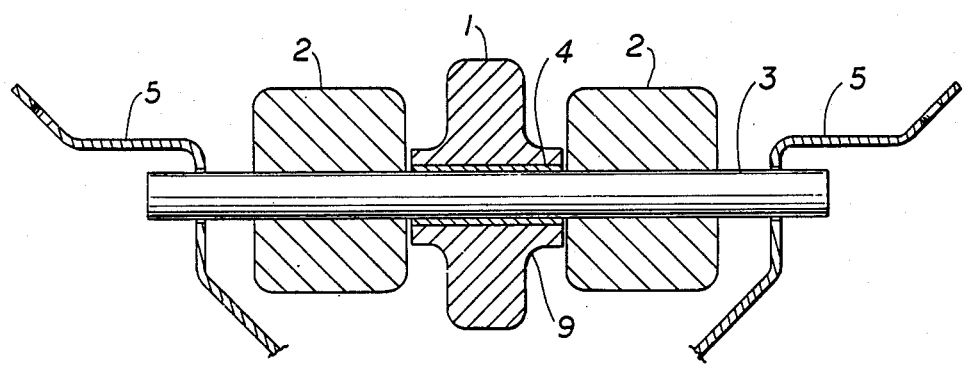

The embodiment of the preferred invention 10 will now be described in relation to the drawings for a better understanding. Referring to the drawing in FIG. 1, Numerals 1 and 2 designate elastomer rubber wheels. These wheels 1 and 2 rotate about a central axis on a metal shaft 3. The metal shaft 3 forms the central axis which enables the rubber wheels 1 and 2 to be rotated about the longitudinal axis of the shaft 3 as a horse attempts to chew the rubber wheels 1 and 2.

Rubber wheel 1 has an internal tubular sleeve 4 so that the wheel 1 can rotate independently on the shaft 3. This wheel 1 is free to rotate in either direction along the longitudinal axis of the shaft 3. Rubber wheel 1 also includes an outwardly tapered shoulder 9 on both sides which serves as a spacer between rubber wheels 2.

The smell of copper to horses is like a sugar taste to humans. By using a copper sleeve 4 in at least one of the rubber wheels 1, a horse is enticed to bite the rubber wheels 1 and 2 to get at the copper. A copper sleeve is normally used in a minimum of one wheel 1 in each complete device 10.

The elastomer rubber wheel 2 is fixed to the metal shaft 3. When a horse bites or chews a wheel 2; both the wheel 2 and the shaft 3 will rotate along its longitudinal axis in either direction of double arrow "A". Rotation in either direction of any one wheel 2 causes the shaft 3 and all other wheels 2 affixed to the shaft to rotate in the same direction. By being affixed to the shaft 3 these wheels 2 move independent of the other wheels 1 on the shaft 3 because of sleeve 4 in wheel 1.

By using the combination of alternating wheels- i.e. one wheel 1 with an inserted tubular sleeve 4 next to wheel 2 affixed to the shaft 3, the horse is unable to get a firm bite on any combination of two wheels 1 and 2 as the wheels rotate independently of each other. As a horse bites any two of the wheels 1 and 2, the wheels rotate in the opposite direction of each other lessening the possibility of a horse obtaining a firm grip on any rubber wheel. Note that adjacent wheels have different diameters. This facilitates counter rotation and, therefore, the horse will not bite firmly on the wheels.

By using smooth, rounded external edges 12 on the rubber wheels 1 and 2 and by making the diameter of the wheels 1 and 2 slightly larger than a horse's typical bite size, a horse is not able to get a firm grip on any wheel 1 and 2. The natural elasticity, tensile strength and resiliency of elastomer rubbers used in the wheels 1 and 2 also inhibits a horse from getting a firm bite on the rubber wheels 1 and 2. For example, elastomer rubbers having a Shore Hardness range from A60-D40 is suitable.

In use, the elastomer rubber wheels 1 and 2 become slippery from the horse's saliva, further making the wheels more difficult for a horse to get a firm bite on a rubber wheel 1 and 2.

In addition, various non-toxic scents may be added to the rubber wheels 1 and 2 to make the device more attractive to a horse's natural smelling sense thereby luring a horse to chew the wheels 1 and 2. For example, a synthetic apple scent, integrally mixed with the elastomers during molding of the wheels provides a durable stimulus.

Each end of the shaft 3 is affixed to an adjoining wall W in a corner C by a metal bracket 5. Two of these brackets 5 are permanently affixed, one to each wall in a corner of an enclosed area for containing horses. Each end of the shaft 3 is inserted into an oblong hole 6 defining a slot in the middle of one of the brackets 5. The shaft 3 is free to rotate in the bracket hole 6 anytime a horse plays or chews any of the rubber wheels.

The oblong hole 6 in the metal bracket 5 allows the shaft 3 to be pulled or pushed vertically by the horse from one edge of the hole to the other edge when the horse plays with the rubber wheels 1 and 2. This creates some noise from the horse's activity. Bored horses like this noise capability and so will play with the device 10 longer to hear the noise.

The corner installation of the brackets 5 also minimizes the chance of a horse becoming injured. By placing the device 10 in a corner, the two adjoining walls form an isosceles triangle (2 equal sides) in the corner thereby providing a natural barrier to protect a horse from being injured since no object protrudes from a single wall. Moreover, a horse backing into the corner will engage the walls W before the device 10.

The bracket 5 itself is formed as a substantially "V" shaped structure having legs 5A defining the crotch of the "V" and free ends 5B provided with holes 5C to fasten to the walls W. The oblong hole 6, forming the slot is carried on one leg 5A.

The referred drawings reflect wheels having outer round peripheries. In the above description and in all the referred drawings wheels 1 and 2 are preferably a piece of elastomer rubber of any external shape or design with a round cylindrical hole from which the wheel 1 and 2 can turn or rotate about a central axis or shaft 3. However, the outer peripheries of the elastomer wheels 1 and 2 can be of any shape or design (e.g. triangular, ribbed, square with tapered edges, etc.) as long as the wheels 1 and 2 rotate about a central axis. Note the ribbed periphery of wheel 2 in one form of the invention. Ribs 7, separated by interstices 8 increase the surface area of the wheel periphery enhancing the scent and providing a textured surface for the horse.

For the sake of clarity a series of three wheels 1 and 2 is used to illustrate this device in the referred drawings. However, any combination of wheels 1 and 2 or a single wheel along may serve the same function embodied in this application. Preferably, however, the wheels 1 and 2 are alternately placed side by side on the shaft 3 and are capable of being rotated in opposite directions simultaneously.

Beside horse chewers there are also horses who are called "cribbers" or "wind-suckers". A cribber is a horse that has developed the bad habit of grabbing hold of a ledge of a fence, door or similar structure with his teeth, then pulls back hard, arching his neck and bringing his head almost vertical. At this point the horse will take in a big gulp of air. These horses become cribbers perhaps because they are also bored, seldom ridden and don't get exercised enough. The referred invention may serve as a viable alternative to break the cribbing habit and also aid in reducing the chance of horses developing into cribbers.

We claim:

1. A device for pacifying a horse or the like from a tendency to chew on forbidden objects, comprising, in combination:
   a plurality of wheels each dimensioned slightly larger than the horse's bite size,
   said wheels all carried on a single shaft having a common axis of rotation,
   alternate said wheels fixed to a said shaft, wheels independently between said alternate wheels carried loosely on said shaft to rotate independant of said shaft,
   whereby a horse engaging two adjacent said wheels (causes those wheels to rotate in opposite directions rendering) will be unlikely to obtain a firm grip on the device because said wheels are dimensional slightly larger than the horse's bite size,
   wherein said wheels are formed from an elastomer providing resiliency and protection for the teeth of the horse,
   said elastomer including a flavoring scent to attract the horse,
   wherein said fixed wheels on said shaft have a lesser diameter and a greater thickness than said loosely carried wheels,
   wherein said loosely carried wheels are carried on said shaft by means of a copper sleeve.

2. The device of claim 1 wherein said shaft is supported by first and second brackets fixed respectively to first and second walls adjacent a corner of an enclosure for the horse,
   each said bracket including an elongate slot which receives one free end of said shaft such that there is clearance between said slots and said shaft,
   whereby the horse can not remove said device but can rattle said free ends in said slots to provide auditory stimulus,
   and placement of said device adjacent the corner minimizes likelihood of horse injury.

3. A device for pacifying a horse comprising in combination:

a resilient means carried on a support means fixed to preclude removal by the horse, and a scent lure impregnated in said resilient means to attract the horse, encouraging the horse to chew on said resilient means without damage to the horse, wherein said resilient means includes a plurality of wheels each dimensioned slightly larger than the horse's bite size and formed from an elastomer, said wheels all carried on a single shaft having a common axis of rotation, alternate said wheels fixed to said shaft, wheels interposed between said alternate wheels carried loosely on said shaft to rotate independently of said shaft, whereby a horse engaging two adjacent said wheels will be unlikely to obtain a firm grip on the device because said wheels are dimensioned slightly larger than the horse's bite size, wherein said fixed wheels on said shaft have a lesser diameter and a greater thickness than said loosely carried wheels, wherein said loosely carried wheels are carried on said shaft by means of a copper sleeve.

4. The device of claim 3 wherein said shaft is supported by first and second brackets fixed respectively to first and second walls adjacent in a corner of an enclosure for the horse, each said bracket including an elongate slot which receives one free end of said shaft such that there is clearance between said slots and said shaft, whereby the horse can not remove said device but can rattle said free ends in said slots to provide auditory stimulus, and placement of said device adjacent the corner minimizes likelihood of horse injury.

5. A device for pacifying a horse or the like, comprising in combination:

first and second brackets fixed respectively to first and second walls adjacent a corner of an enclosure for the horse, each said bracket including an elongate slot which receives one free end of a horse attracting means such that there is clearance between said attracting means free ends and said slots, whereby the horse cannot remove said attracting means but can rattle said free ends in said slots to provide auditory stimulus, and placement of said device adjacent the corner minimizes likelihood or horse injury, wherein sid attracting means includes:

a resilient means carried on said brackets fixed to preclude removal by the horse, and a scent lure impregnated in said resilient means to attract the horse, encouraging the horse to chew on said resilient means without injury to the horse, wherein said resilient means includes:

a plurality of wheels each dimensioned slightly larger than the horse's bite size, said wheels all carried on a single shaft having a common axis of rotation, alternate said wheels fixed to said shaft, wheels interposed between said alternate wheels carried loosely on said shaft to rotate independently of said shaft, whereby a horse engaging two adjacent said wheels will be unlikely to obtain a firm grip on the device because said wheels are dimensioned slightly larger than the horse's bite size, wherein said fixed wheels on said shaft have a lesser diameter and a greater thickness than said loosely carried wheels, wherein said loosely carried wheels are carried on said shaft by means of a copper sleeve.

6. The device of claim 5 wherein said brackets are configured as substantially "V" shaped configuration having legs defining said "V", and free ends extending from said legs provided with holes for fastening to the walls of the enclosure, and said elongate slot passes through one leg of said "V" shaped bracket.

7. A device for pacifying a horse or the like from a tendency to chew on forbidden objects, comprising in combination:

a plurality of wheels each dimensioned slightly larger than the horse's bite size, said wheels all carried on a single shaft having a common axis of rotation, alternate said wheels fixed to said shaft, wheels interposed between said alternate wheels loosely carried on said shaft by means of a copper sleeve, whereby a horse engaging two adjacent said wheels will be unlikely to obtain a firm grip on the device because said wheels are dimensioned slightly larger than the horse's bite size.

8. The device of claim 7 wherein said wheels are formed from an elastomer providing resiliency and protection for the teeth of the horse, said elastomer including a flavoring scent to attract the horse.

9. The device of claim 7 wherein said fixed wheels on said shaft have a lesser diameter and a greater thickness than said loosely carried wheels.

10. The device of claim 7 wherein said shaft is supported by first and second brackets fixed respectively to first and second walls adjacent a corner of an enclosure for the horse, each said bracket including an elongate slot which receives one free end of said shaft such that there is clearance between said slots and said shaft, whereby the horse can not remove said device but can rattle said free ends in said slots to provide auditory stimulus, and placement of said device adjacent the corner minimizes likelihood of horse injury.

11. A device for pacifying a horse comprising in combination:

a resilient means carried on a support means fixed to preclude removal by the horse including a copper sleeve interposed between a portion of said resilient means and said support means, and a scent lure impregnated in said resilient means to attract the horse, encouraging the horse to chew on said resilient means without damage to the horse wherein said resilient means includes a plurality of wheels each dimensioned slightly larger than the horse's bite size and formed from an elastomer, said wheels all carried on a single shaft having a common axis of rotation, alternate said wheels fixed to said shaft, wheels interposed between said alternate wheels loosely carried on said shaft by means of said copper sleeve, whereby a horse engaging two adjacent said wheels renders less likely the horse will obtain a firm grip on the device.

12. The device of claim 11 wherein said fixed wheels on said shaft have a lesser diameter and a greater thickness than said loosely carried wheels.

13. The device of claim 11 wherein said shaft is supported by first and second brackets fixed respectively to first and second walls adjacent in a corner of an enclosure for the horse,
- each said bracket including an elongate slot which receives one free end of said shaft such that there is clearance between said slots and said shaft,
- whereby the horse can not remove said device but can rattle free ends in said slots to provide auditory stimulus,
- and placement of said device adjacent the corner minimizes likelihood of horse injury.

14. A device for pacifying a horse or the like, comprising in combination:
- first and second brackets fixed respectively to first and second walls adjacent a corner of an enclosure for the horse,
- each said bracket including an elongate slot which receives one free end of a horse attracting means including a copper sleeve such that there is clearance between said attracting means free ends and said slots,
- whereby the horse can not remove said attracting means but can rattle said free ends in said slots to provide auditory stimulus,
- and placement of said device adjacent the corner minimizes likelihood of horse injury wherein said attracting means includes:
- a resilient means carried on said brackets fixed to preclude removal by the horse,
- and a scent lure impregnated in said resilient means to attract the horse, encouraging the horse to chew on said resilient means without injury to the horse wherein said resilient means includes a plurality of wheels each dimensioned slightly larger than a horse's bite size,
- said wheels all carried on a single shaft having a common axis of rotation and alternate said wheels fixed to said shaft, wheels interposed between said alternate wheels carried loosely on said shaft by means of said copper sleeve,
- whereby a horse engaging two adjacent said wheels renders less likely the horse will obtain a firm grip on the device.

15. The device of claim 14 wherein said fixed wheels on said shaft have a lesser diameter and a greater thickness than said loosely carried wheels.

16. The device of claim 14 wherein said brackets are configured as substantially "V" shaped configuration having leg defining said "V",
- and free ends extending from said legs provided with holes for fastening to the walls of the enclosure,
- and said elongate slot passes through one leg of said "V" shaped bracket.

* * * * *